United States Patent
Graceffo et al.

(10) Patent No.: US 11,374,659 B2
(45) Date of Patent: Jun. 28, 2022

(54) ACOUSTIC TO OPTICAL COMMUNICATIONS SYSTEMS AND METHODS

(71) Applicant: RAYTHEON COMPANY, Waltham, MA (US)

(72) Inventors: Gary M. Graceffo, Burke, VA (US); Andrew Kowalevicz, Arlington, VA (US); Benjamin P. Dolgin, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 17/082,545

(22) Filed: Oct. 28, 2020

(65) Prior Publication Data
US 2021/0126715 A1    Apr. 29, 2021

Related U.S. Application Data

(60) Provisional application No. 62/927,343, filed on Oct. 29, 2019.

(51) Int. Cl.
| | |
|---|---|
| *H04B 10/00* | (2013.01) |
| *H04B 11/00* | (2006.01) |
| *H04B 10/548* | (2013.01) |
| *H04B 10/524* | (2013.01) |
| *H04B 13/02* | (2006.01) |
| *H04J 14/00* | (2006.01) |

(52) U.S. Cl.
CPC ........... *H04B 11/00* (2013.01); *H04B 10/524* (2013.01); *H04B 10/548* (2013.01); *H04B 13/02* (2013.01)

(58) Field of Classification Search
CPC ... H04B 10/11; H04B 10/112; H04B 10/1121; H04B 10/1123; H04B 10/116; H04B 10/118; H04B 10/80; G01H 9/00
See application file for complete search history.

(56) References Cited

U.S. PATENT DOCUMENTS

| | | | |
|---|---|---|---|
| 5,822,047 A * | 10/1998 | Contarino | G01S 17/89 356/5.01 |
| 9,018,575 B2 | 4/2015 | Kowalevicz et al. | |
| 9,165,963 B2 | 10/2015 | Kowalevicz et al. | |
| 9,171,219 B2 | 10/2015 | Kowalevicz | |
| 9,323,034 B2 | 4/2016 | Dolgin | |
| 9,400,414 B2 | 7/2016 | Kowalevicz | |
| 9,451,185 B2 | 9/2016 | Dolgin et al. | |
| 9,503,660 B2 | 11/2016 | Kowalevicz et al. | |

(Continued)

*Primary Examiner* — Daniel G Dobson
(74) *Attorney, Agent, or Firm* — Lando & Anastasi, LLP

(57) ABSTRACT

Methods and apparatus for acoustic to optical communications. In one example, a method includes performing active optical measurements of modulation-based surface deformations at a surface of a body of water using an active optical receiver to produce modulation data, the modulation-based surface deformations being representative of a modulation of a modulated acoustic signal originating beneath the surface of the body of water, between instances of performing the active optical measurements of the modulation-based surface deformations, optically measuring surface conditions of the body of water to produce channel information, and based on the modulation data and the channel information, recovering data encoded in the modulation of the modulated acoustic signal.

20 Claims, 3 Drawing Sheets

(56) References Cited

U.S. PATENT DOCUMENTS

| | | |
|---|---|---|
| 9,535,245 B1 | 1/2017 | Kowalevicz |
| 9,538,096 B2 | 1/2017 | Dolgin |
| 9,887,779 B2 | 2/2018 | Kowalevicz |
| 9,973,281 B2 | 5/2018 | Kowalevicz et al. |
| 10,164,765 B2 | 12/2018 | Dolgin et al. |
| 10,177,856 B2 | 1/2019 | Kowalevicz et al. |
| 10,205,526 B2 | 2/2019 | Kowalevicz |
| 10,225,020 B2 | 3/2019 | Dolgin et al. |
| 10,228,277 B1 * | 3/2019 | Land .................. G01S 17/04 |
| 10,243,670 B2 | 3/2019 | Kowalevicz et al. |
| 10,243,673 B2 | 3/2019 | Dolgin et al. |
| 10,250,292 B2 | 4/2019 | Graceffo et al. |
| 10,256,917 B2 | 4/2019 | Dolgin et al. |
| 10,305,602 B2 | 5/2019 | Dolgin et al. |
| 10,313,022 B2 | 6/2019 | Dolgin et al. |
| 10,340,965 B2 | 7/2019 | Dolgin et al. |
| 10,374,743 B2 | 8/2019 | Dolgin et al. |
| 10,378,880 B2 | 8/2019 | Dolgin et al. |
| 10,498,464 B2 | 12/2019 | Graceffo et al. |
| 10,530,494 B2 | 1/2020 | Dolgin et al. |
| 10,554,306 B1 | 2/2020 | Graceffo et al. |
| 10,571,774 B2 | 2/2020 | Graceffo et al. |
| 10,637,580 B2 | 4/2020 | Dolgin et al. |
| 10,686,533 B2 | 6/2020 | Dolgin et al. |
| 10,714,251 B2 | 7/2020 | Dolgin et al. |
| 10,826,603 B1 | 11/2020 | Kowalevicz et al. |
| 10,924,189 B2 | 2/2021 | Kowalevicz et al. |
| 11,012,160 B2 | 5/2021 | Kowalevicz et al. |
| 11,101,896 B2 | 8/2021 | Kowalevicz et al. |
| 11,133,873 B1 | 9/2021 | Kowalevicz et al. |
| 11,159,244 B2 | 10/2021 | Graceffo et al. |
| 11,159,245 B2 | 10/2021 | Kowalevicz et al. |
| 2017/0184399 A1 | 6/2017 | Thayer et al. |
| 2018/0045544 A1 * | 2/2018 | Dawson .................. G01H 9/00 |
| 2020/0136727 A1 | 4/2020 | Graceffo et al. |
| 2020/0371328 A1 | 11/2020 | Kowalevicz et al. |
| 2020/0403709 A1 | 12/2020 | Graceffo et al. |
| 2020/0409189 A1 | 12/2020 | Graceffo et al. |
| 2021/0006336 A1 | 1/2021 | Kowalevicz et al. |
| 2021/0021351 A1 | 1/2021 | Kowalevicz et al. |
| 2021/0021449 A1 | 1/2021 | Graceffo et al. |
| 2021/0041515 A1 | 2/2021 | Dolgin |
| 2021/0099232 A1 | 4/2021 | Graceffo et al. |
| 2021/0099234 A1 | 4/2021 | Graceffo et al. |
| 2021/0105073 A1 | 4/2021 | Graceffo et al. |
| 2021/0314071 A1 | 10/2021 | Graceffo et al. |
| 2022/0014276 A1 | 1/2022 | Kowalevicz et al. |

* cited by examiner

ACOUSTIC TO OPTICAL COMMUNICATIONS SYSTEMS AND METHODS

CROSS-REFERENCE TO RELATED APPLICATIONS

This application claims priority under 35 USC § 119(e) to U.S. Provisional Patent Application Ser. No. 62/927,343, titled "ACOUSTIC TO OPTICAL COMMUNICATIONS SYSTEMS AND METHODS," filed Oct. 29, 2019, which is incorporated by reference herein in its entirety for all purposes.

BACKGROUND

Communications between an aircraft or satellite and submarines or other submerged devices is very difficult. Several techniques exist for closing this link, but all have limitations. For example, a combined acoustic signal and radar technique has been proposed. This method uses radar to measure acoustic disturbances on the surface caused by acoustic signals.

SUMMARY OF INVENTION

Aspects and embodiments provide improved systems and methods for establishing communications links between an underwater object and an airborne or space-based platform based on a combined acoustic and optical approach that uses water surface tension to convert between the two communications mediums.

According to one embodiment, an acoustic to optical communications method comprises emitting a modulated acoustic signal from an underwater object submerged in a body of water towards a surface of the body of water, with an active optical transceiver, optically measuring surface deformations at the surface of the body of water produced by the modulated acoustic signal, the surface deformations being representative of a modulation of the modulated acoustic signal, and recovering information encoded on the acoustic signal by the modulation based on the measurements of the surface deformations.

In one example, the modulation of the modulated acoustic signal is phase modulation and measuring the surface deformations includes detecting at least one of constructive and destructive interference patterns at the surface of the body of water.

In another example, the modulation of the modulated acoustic signal is amplitude modulation and measuring the surface deformations includes optically measuring a change in water surface height relative to a reference. In one example, measuring the surface deformations further includes measuring a rate of change of the water surface height.

The method may further comprise performing additional water surface measurements to produce surface condition data to characterize communications channel noise at a given time. In one example, performing the additional water surface measurements occurs between instances of measuring the surface deformations representative of the modulation of the modulated acoustic signal.

According to another embodiment, a method of acoustic to optical communications comprises performing active optical measurements of modulation-based surface deformations at a surface of a body of water using an active optical receiver to produce modulation data, the modulation-based surface deformations being representative of a modulation of a modulated acoustic signal originating beneath the surface of the body of water, between instances of performing the active optical measurements of the modulation-based surface deformations, optically measuring surface conditions of the body of water to produce channel information, and based on the modulation data and the channel information, recovering data encoded in the modulation of the modulated acoustic signal.

In one example, performing the active optical measurements of the modulation-based surface deformations includes detecting at least one of constructive and destructive interference patterns at the surface of the body of water. In another example, recovering the data encoded in the modulation of the modulated acoustic signal includes detecting phase changes indicative of phase modulation of the modulated acoustic signal based on the detected interference patterns.

In one example, performing the active optical measurements of the modulation-based surface deformations includes measuring a rate of change of a height of the surface.

In another example, performing the active optical measurements of the modulation-based surface deformations includes measuring a height of the surface relative to a reference. In one example, recovering the data includes detecting amplitude modulation of the modulated acoustic signal based on changes in the height.

According to another embodiment, an active optical receiver configured for acoustic to optical communications comprises a LiDAR transmitter configured to produce an optical probe signal for measuring modulation-based surface deformations of a surface of a body of water representative of a modulation of a modulated acoustic signal originating beneath the surface of the body of water, a LiDAR receiver configured to receive reflections of the optical probe signal from the body of water and to output first measurement data based on the reflections of the optical probe signal, the first measurement data being representative of the modulation of the modulated acoustic signal, an interpreter module configured to recover binary symbols from the first measurement data, and a message reconstruction module configured to convert the binary symbols into a message structure having one of a first message class and a second message class, the first message class being a data message and containing information corresponding to data encoded in the modulation of the modulated acoustic signal.

In one example, the LiDAR transmitter is further configured to produce an optical channel measurement signal for measuring surface conditions of the body of water, and the LiDAR receiver is further configured to receive reflections of the optical channel measurement signal from the body of water and to output second measurement data based on the reflections of the optical channel measurement signal, the second measurement data being representative of the surface conditions of the body of water. The active optical receiver may further comprise a surface correction module configured to receive the second measurement data and to provide surface condition information to the interpreter module. In one example, the interpreter module is configured to use the surface condition information to recover the binary symbols from the first measurement data. In another example, the interpreter module is configured to recover the binary symbols from the first measurement data and the second measurement data, and the message reconstruction module is configured to convert the binary symbols recovered from the first measurement data into the message structure having the first message class and to convert the binary symbols recovered from the second measurement data into the message structure having the second message class.

In one example, the optical receiver further comprises a data storage module configured to store the information corresponding to the data encoded in the modulation of the modulated acoustic signal.

In another example, the LiDAR receiver includes an optical resonator. In one example, the optical resonator is a Fabry-Perot etalon.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a combined acoustic-optical communications method and system that can be used to establish a communications link between an underwater object, such as a submarine, and an object that transmits and receives optical signals through free space, such as a ship, an aircraft, or a satellite, for example (generally referred to herein as a "communications platform"). As discussed above, a combined acoustic signal and radar technique has been proposed for communications between an airborne platform and a submarine. However, since radar signals have much longer wavelengths that optical signals, they have significantly lower resolution, which limits the ability to communicate using this technique. In contrast, optical signals have far greater measurement resolution and therefore offer a significant improvement in performance.

Figure 1:
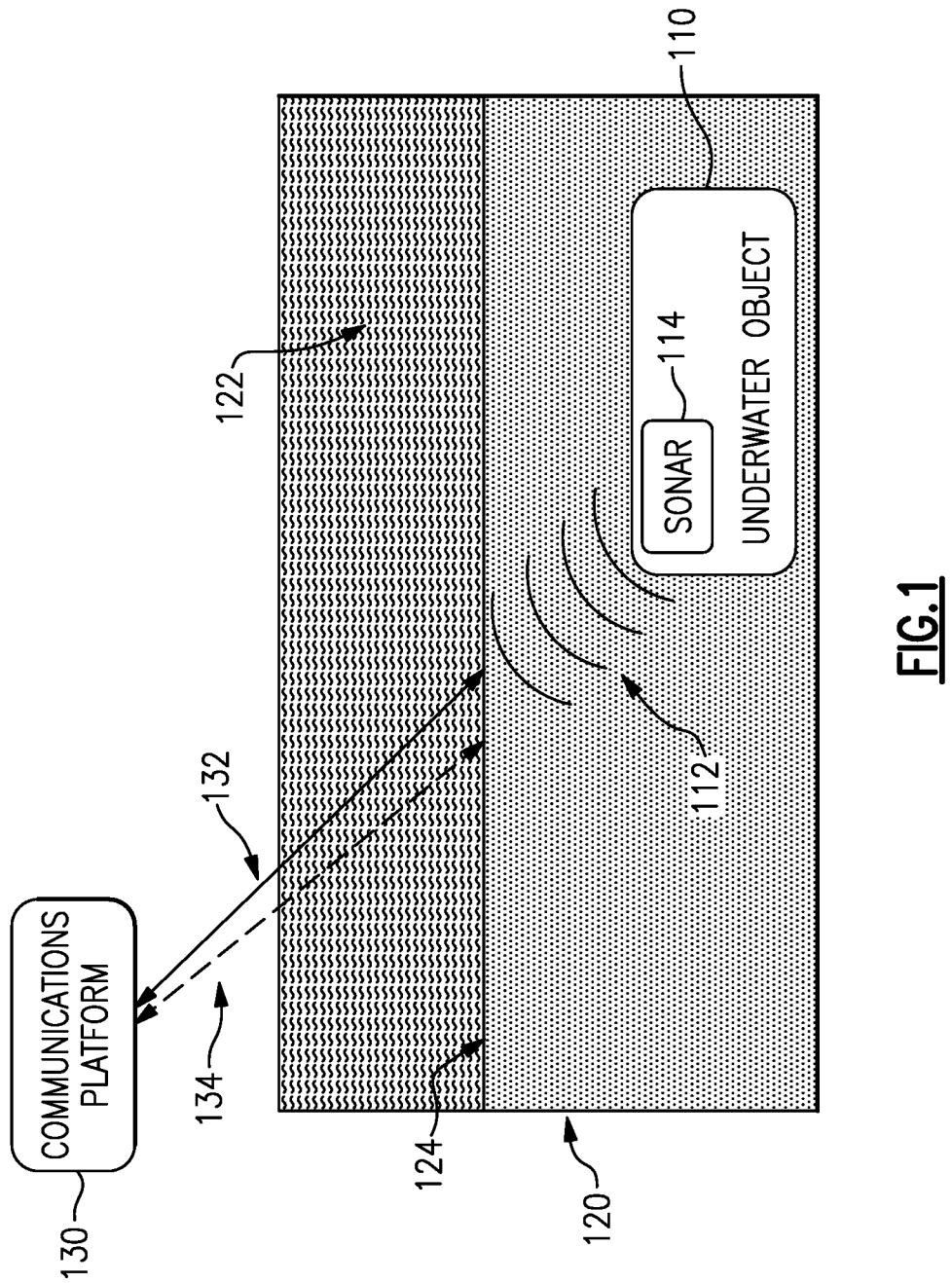
FIG. 1 is a block diagram of an acoustic-optical communications system according to aspects of the present invention.

FIG. 1 is a block diagram of one example of such a communications system according to certain embodiments. Referring to FIG. 1, an underwater object 110 (generally referred to below as a submarine) is submerged in a body of water 120, such as an ocean. The submarine 110 sends an acoustic signal (acoustic waves) 112 towards the surface 122 of the water 120 using a sonar or other acoustic generating apparatus 114, for example. The acoustic waves 112 strike the surface boundary 124, causing a deformation of the water's surface 122 (e.g., ripples). The communications platform 130 includes an active optical receiver (also referred to herein as an optical transceiver), such as a LiDAR system, for example, configured to measure these deformations for subsequent demodulation, as discussed further below. For example, if the acoustic waves 112 transmitted by the sonar 114 of the submarine 110 are used as a carrier, then these transmissions can be modulated with a signal (binary or analog) that carries information. The LiDAR or other optical system onboard the free space object 130 can make measurements of the surface deformations in the region of the transmission that can be used for demodulation. In certain examples, conventional digital signal processing techniques can be used to recover the data encoded in the LiDAR measurements.

As the acoustic waves 112 from the submarine 110 strike the surface boundary 124, the resulting deformations of the water surface 122 have characteristics representative of properties of the acoustic waves 112. Modulation of the acoustic signal 112 to encode information alters the characteristics of the acoustic waves and therefore of the resulting water surface deformations. Accordingly, one approach to demodulation is to use the features generated by the acoustic waves 112 on the surface 122 of the water 120. For example, phase modulation applied to the acoustic signal 112 can be detected using interference patterns created on the surface 122 of the water 120. As long as the phase of the acoustic signal 112 is maintained, the surface 122 is in a steady state condition. During the steady state, well-formed concentric circular waves are radiated from the epicenter. When the phase changes, the surface behavior moves from steady state to transient. The transient behavior is caused by destructive interference caused by the change in phase of the acoustic signal 112. Thus, detection of the destructive state may be used to determine a phase change in modulation of the acoustic signal 112.

Similarly, amplitude modulation of the acoustic signal 112 produces measurable changes in the resulting surface deformations. As the acoustic signal 112 hits the surface boundary 124, it causes a vertical displacement/deformation. In certain examples, the height of this deformation may provide information about the amplitude of the acoustic signal 112. For example, a LiDAR system may be used to determine the change in sea state height relative to a reference. The LiDAR system may also be used to determine the rate of change of sea state height. In other examples, a "return to zero" amplitude modulation of the acoustic signal 112 can be used. In this scheme, for a binary "1" a pulse of the acoustic signal 112 is present, and for a binary "0," no acoustic signal is present. Thus, for this type of amplitude modulation, rather than looking for constructive and destructive interference as in the case of phase modulation, detection may be achieved by looking for the presence or absence of a propagating wave front. Pulse width modulation of the acoustic signal 112 may also be used. According to certain embodiments, the type of modulation used on the acoustic signal 112 may not be important as long as it causes a change in the surface conditions of the water 120 that can be measured by the free space object 130. By measuring characteristics of the surface deformations of the water 120 in the region of the acoustic signal 112, modulation information about the acoustic signal 112 can be obtained, and the signal can thus be effectively demodulated to recover the encoded information.

Figure 2:
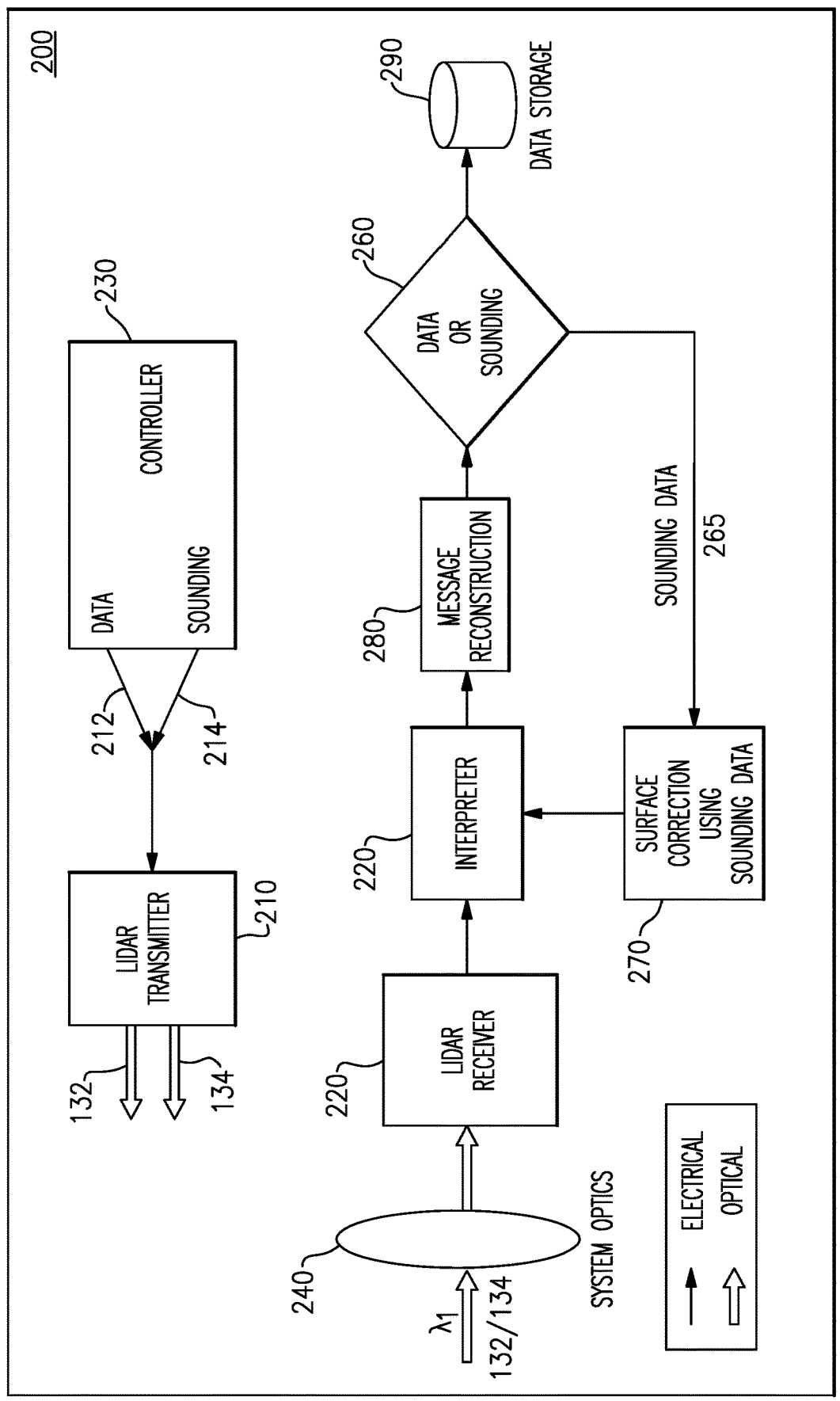
FIG. 2 is a block diagram of one example of an active optical receiver according to aspects of the present invention.

As discussed above, according to certain embodiments, the surface deformations can be optically detected and measured using a LiDAR system or other optical imaging approach. Referring to FIG. 2, there is illustrated a block diagram of one example of a LiDAR-based optical transceiver 200 that may be used in the communications platform 130. The optical transceiver 200 includes a LiDAR transmitter 210 that produces an optical probe signal 132 (also shown in FIG. 1), and a LiDAR receiver 220 that receives reflections of the optical probe signal 132 for optically measuring the water surface deformations produced by the acoustic signal 112, as discussed above. In many instances, conditions of the water surface 122, such as undulations caused by waves/wind etc., and other variations in the surface, may introduce noise into the optical measurements. In addition, further wavefront distortion of the optical signals 132 can be caused by atmospheric conditions Accordingly, in certain embodiments, the optical transceiver 200 is further configured to make surface measurements to characterize the optical communications channel at any given time. An advantage of using LiDAR or other optical techniques for detecting/measuring the acoustic signals 112 is that the data rate for optical signals is far greater than for acoustic signals and, therefore, there is time in between symbols of information on the acoustic signal 112 for channel measurements to be made. Accordingly, in certain embodiments, the LiDAR transmitter 210 can be further configured to produce a channel measurement signal 134 for characterizing the communications channel. The channel measurements signal 134 can be used to characterize standard channel deformation and to remove/reduce background channel noise and thereby improve the sensitivity of the of the optical transceiver 200 for measuring the acoustic signals 112.

Thus, the optical transceiver 200 may include a controller 230 that controls the LiDAR transmitter 210 to produce either the optical probe signal 132 for collecting information (data) from the acoustic signals 112, or the channel measurement signal 134. As shown in FIG. 2, the controller 230 may provide a "data" instruction 212 to the LiDAR transmitter 210 to produce the optical probe signal 132, or a "sounding" instruction 214 to control the LiDAR transmitter to produce the channel measurement signal 134. In certain examples, the two signals 132, 134 may be essentially the same; in other examples, the signals 132, 134 may differ in terms of characteristics such as signal power, wavelength, etc.

Still referring to FIG. 2, the optical transceiver 200 may include system optics 240, which may include one or more lenses and/or mirrors, for receiving the optical signals 132, 134 from the water surface 122. Although not shown in FIG. 2, in certain examples, the LiDAR transmitter 210 may also transmit the optical signals 132, 134 via the system optics 240. The LiDAR receiver 220 receives the optical signals 132, 134 and outputs corresponding measurement data. This may be a standard type of output for a LiDAR receiver. In certain examples, particularly where phase modulation is used for the acoustic signals 112, the LiDAR receiver may include a Fabry-Perot etalon or other resonator assembly to reduce the effects of wavefront distortion induced by both atmospherics and the undulating water surface 122.

The optical transceiver 200 may further include an interpreter module 250 that interprets the measurements output from the LiDAR receiver 220 such that binary symbols can be recovered from the measurements. As discussed above, in certain examples, the optical transceiver 200 can be configured into a measurement mode in which the optical channel measurement signal 134 is used to make surface measurements to produce surface condition data (also referred to as "sounding data"). Accordingly, as indicated by decision block 260, when in the measurement mode and the optical channel measurement signal 134 is received by the LiDAR receiver 220, the sounding data 265 may be provided to a surface correction module 270. The surface correction module 270 provides the interpreter module 250 with surface condition data that the interpreter module 250 uses to more accurately recover the binary symbols. A message reconstruction module 280 converts the binary symbols into a known message structure. In certain examples, there are two classes of messages, namely data and measurements. As discussed above, measurements (sounding data 265) are sent to the surface correction module 270. Data (corresponding to the information encoded via modulation of the acoustic signals 112) may be stored in a data storage module 290.

Figure 3:
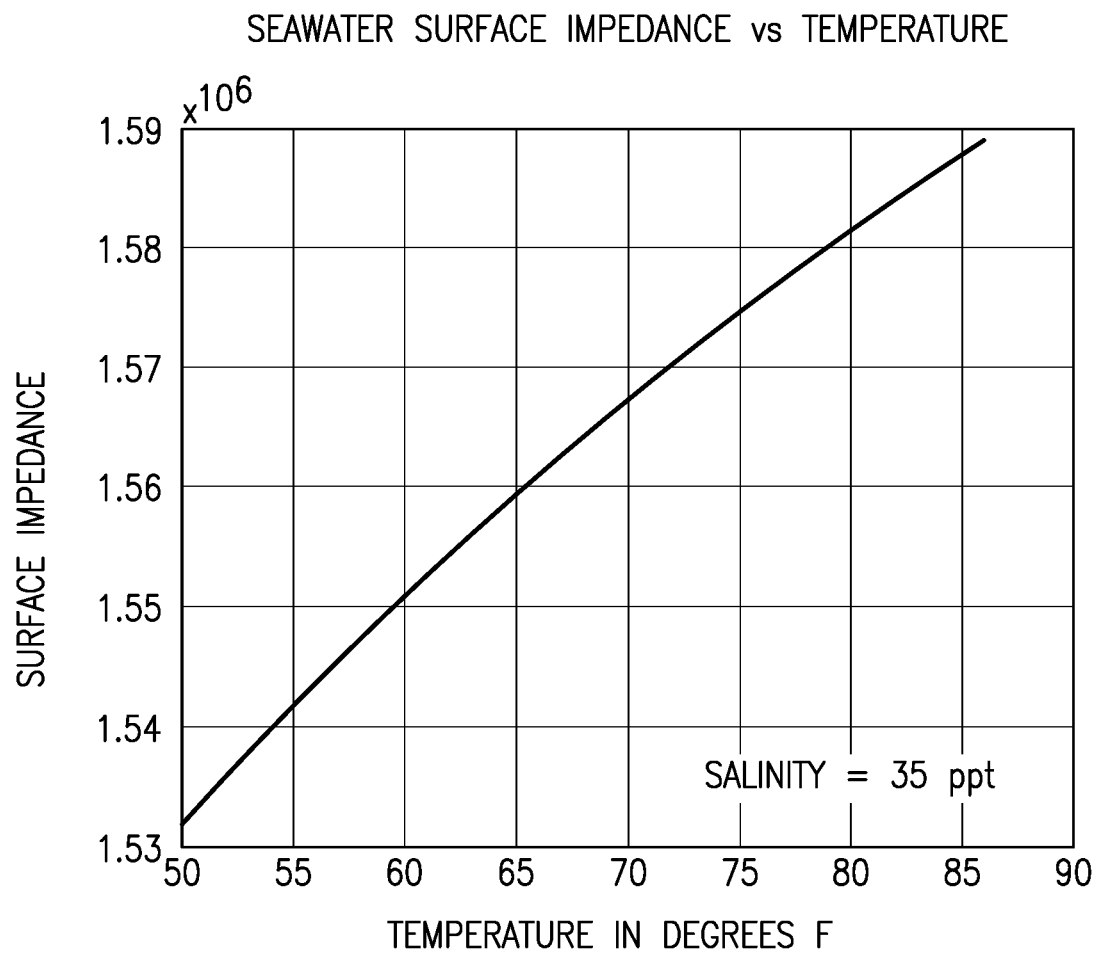
FIG. 3 is a graph of seawater surface impedance as a function of temperature.

According to certain embodiments, two conditions should be met for optimal implementation of the communications methods disclosed herein. The first condition is that the majority of the acoustic energy is internally reflected (into the water 120) at the air-water boundary 124. This requirement ensures that the majority of the acoustic energy in the acoustic signal 112 is used to deform the surface 122 and not merely pass through it. For this condition to be met there must be a large impedance mismatch at the boundary 124. Analysis has verified that this condition is met for seawater. The impedance of air at sea level is approximately 410 Ohms at a temperature of 25° C. The impedance of the water 120 at the surface 122 is a function of temperature and salinity. The graph in FIG. 3 shows the surface impedance as a function of temperature for a constant salinity. As shown in FIG. 3, the water surface impedance is about 1.5 Megohms. This ensures a reflection coefficient of −1, which means total internal reflection. Thus, this condition is met. The second condition is that the period of a baud is less than the sea-state undulation period. Typically, wave periods in the ocean are approximately seconds in duration. According to certain embodiments, data may be transmitted on the acoustic signals 112 at a rate of 100 kbaud to 1 Mbaud. Thus, the baud periods are far shorter than the wave periods, and this second condition is met. Further, in certain examples, the LiDAR measurement frequency may be far greater than the baud rate, thereby providing for significant over-sampling to reduce measurement noise.

Thus, aspects and embodiments provide a communications system and method that can be used to establish a communications link between an underwater object, such as a submarine, and an object on the water surface (e.g., a ship), in the air, or in space (e.g., a satellite) using surface acoustic signatures and an active optical transceiver. Embodiments may provide an improvement in measurement resolution gained by using optical signals rather than radar. Unlike conventional communications methods that attempt to use signal frequencies that can propagate through both the air and the water, and which much compensate for the changing medium properties at the air-water boundary 124, embodiments of the system and method disclosed herein take advantage of the boundary 124 to "convert" the communications channel between acoustic signals 112 and optical signals 132. As discussed above, LiDAR or another optical imaging technique can be used to measure water surface deformations as a mechanism for acoustic signal to optical signal conversion. Thus, in certain aspects, the communications method involves the use of a modulated acoustic signal to "modulate" a LiDAR signal, which may then be demodulated to recover the encoded information using known techniques. As discussed above, the communications methods and systems disclosed herein may support amplitude or phase modulation of the acoustic signal 112. For example, for acoustically generated phase modulation, an active optical receiver can be used to measure constructive or destructive interference on the surface of the water to determine when the acoustic signal has changed phase. For amplitude modulation, detection may be achieved by looking for the presence or absence of a signature wave front. As also discussed above, certain examples may include a sea state sense characterization mechanism. For example, the LiDAR system (or other optical apparatus) may be used to make sea state measurements that may be used to determine the level of sea clutter or background noise and that are used to improve demodulation.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, it is to be appreciated that embodiments of the methods and apparatuses discussed herein are not limited in application to the details of construction and the arrangement of components set forth in the description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only, and the scope of the invention should be determined from proper construction of the appended claims, and their equivalents.

What is claimed is:

1. An acoustic to optical communications method comprising:
    emitting a modulated acoustic signal from an underwater object submerged in a body of water towards a surface of the body of water;
    with an active optical transceiver, optically measuring surface deformations at the surface of the body of water produced by the modulated acoustic signal, the surface deformations being representative of a modulation of the modulated acoustic signal; and
    recovering information encoded on the acoustic signal by the modulation based on the measurements of the surface deformations.

2. The acoustic to optical communications method of claim 1 wherein the modulation of the modulated acoustic signal is phase modulation, and wherein measuring the surface deformations includes detecting at least one of constructive and destructive interference patterns at the surface of the body of water.

3. The acoustic to optical communications method of claim 1 wherein the modulation of the modulated acoustic signal is amplitude modulation, and wherein measuring the surface deformations includes optically measuring a change in water surface height relative to a reference.

4. The acoustic to optical communications method of claim 3 wherein measuring the surface deformations further includes measuring a rate of change of the water surface height.

5. The acoustic to optical communications method of claim 1 further comprising performing additional water surface measurements to produce surface condition data to characterize communications channel noise at a given time.

6. The acoustic to optical communications method of claim 5 wherein performing the additional water surface measurements occurs between instances of measuring the surface deformations representative of the modulation of the modulated acoustic signal.

7. A method of acoustic to optical communications comprising:
    performing active optical measurements of modulation-based surface deformations at a surface of a body of water using an active optical receiver to produce modulation data, the modulation-based surface deformations being representative of a modulation of a modulated acoustic signal originating beneath the surface of the body of water;
    between instances of performing the active optical measurements of the modulation-based surface deformations, optically measuring surface conditions of the body of water to produce channel information; and
    based on the modulation data and the channel information, recovering data encoded in the modulation of the modulated acoustic signal.

8. The method of claim 7 wherein performing the active optical measurements of the modulation-based surface deformations includes detecting at least one of constructive and destructive interference patterns at the surface of the body of water.

9. The method of claim 8 wherein recovering the data encoded in the modulation of the modulated acoustic signal includes detecting phase changes indicative of phase modulation of the modulated acoustic signal based on the detected interference patterns.

10. The method of claim 7 wherein performing the active optical measurements of the modulation-based surface deformations includes measuring a rate of change of a height of the surface.

11. The method of claim 7 wherein performing the active optical measurements of the modulation-based surface deformations includes measuring a height of the surface relative to a reference.

12. The method of claim 11 wherein recovering the data includes detecting amplitude modulation of the modulated acoustic signal based on changes in the height.

13. An active optical receiver configured for acoustic to optical communications, the active optical receiver comprising:
    a LiDAR transmitter configured to produce an optical probe signal for measuring modulation-based surface deformations of a surface of a body of water representative of a modulation of a modulated acoustic signal originating beneath the surface of the body of water;
    a LiDAR receiver configured to receive reflections of the optical probe signal from the body of water and to output first measurement data based on the reflections of the optical probe signal, the first measurement data being representative of the modulation of the modulated acoustic signal;
an interpreter module configured to recover binary symbols from the first measurement data; and
a message reconstruction module configured to convert the binary symbols into a message structure having one of a first message class and a second message class, the first message class being a data message and containing information corresponding to data encoded in the modulation of the modulated acoustic signal.

14. The active optical receiver of claim 13 wherein the LiDAR transmitter is further configured to produce an optical channel measurement signal for measuring surface conditions of the body of water, and wherein the LiDAR receiver is further configured to receive reflections of the optical channel measurement signal from the body of water and to output second measurement data based on the reflections of the optical channel measurement signal, the second measurement data being representative of the surface conditions of the body of water.

15. The active optical receiver of claim 14 further comprising a surface correction module configured to receive the second measurement data and to provide surface condition information to the interpreter module.

16. The active optical receiver of claim 15 wherein the interpreter module is configured to use the surface condition information to recover the binary symbols from the first measurement data.

17. The active optical receiver of claim 15 wherein the interpreter module is configured to recover the binary symbols from the first measurement data and the second measurement data;
and wherein the message reconstruction module is configured to convert the binary symbols recovered from the first measurement data into the message structure having the first message class and to convert the binary symbols recovered from the second measurement data into the message structure having the second message class.

18. The active optical receiver of claim 13 further comprising a data storage module configured to store the information corresponding to the data encoded in the modulation of the modulated acoustic signal.

19. The active optical receiver of claim 13 wherein the LiDAR receiver includes an optical resonator.

20. The active optical receiver of claim 19 wherein the optical resonator is a Fabry-Perot etalon.

* * * * *